Jan. 11, 1938.　　　G. E. CHESNUT, JR　　　2,105,348
RAPID FOCUSING BINOCULAR
Filed June 3, 1936

INVENTOR.
GUY E. CHESNUT JR.
BY M. Talbert Dick
ATTORNEY.

Patented Jan. 11, 1938

2,105,348

UNITED STATES PATENT OFFICE 2,105,348

RAPID FOCUSING BINOCULAR

Guy E. Chesnut, Jr., St. Joseph, Mo.

Application June 3, 1936, Serial No. 83,290

2 Claims. (Cl. 88—34)

The principal object of this invention is to provide a binocular that may be smoothly and speedily adjusted so that an operator may keep a rapidly moving object in focus.

A further object of this invention is to provide a rapid focusing binocular that is economical in manufacture and durable in use.

A still further object of this invention is to provide a rapid focusing adjustment for binoculars that may be folded so as not to interfere with the placing of the binoculars in a case, pocket or the like.

A still further object of this invention is to provide a rapid focusing binocular wherein the manually operated adjusting lever must be moved over a relatively greater distance than the tubes of the binocular so that vernier adjustment of the focus may be had and so that the focus may be smoothly controlled.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 2:
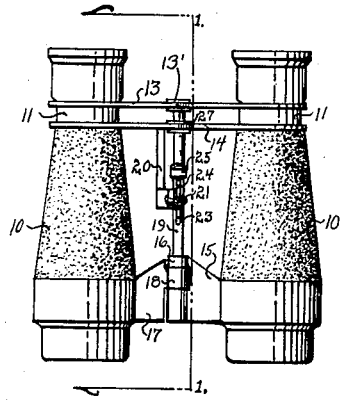
Fig. 2 is a side plan view of the complete binocular and more fully illustrates Fig. 1.
Figure 3:
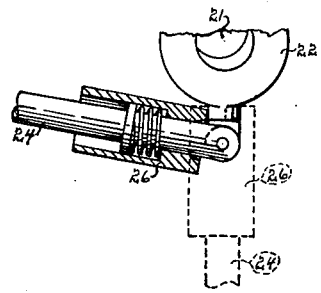
Fig. 3 is a sectional view of a portion of the adjustment lever and spring ferrule.

Binoculars and monoculars now on the market are equipped with several types of adjusting means. The common draw tube type wherein the objective tube is manually moved toward and away from the eyepiece by a telescoping action, has a number of disadvantages. It is very hard to focus, is inaccurate, and is very slow, thus it is only used on cheap types of glasses and on high power telescopes where time of adjustment is not a factor and where great extention of multiple tubes is necessary. Another common type of adjustment consists in the use of a small finger operated lever which operates transversely to the binocular tubes. This type does not have sufficient leverage and, while an improvement over the draw tube type, still have all of the disadvantages of this type. The adjusting lever, by virtue of its transverse motion, is very awkward and cumbersome to adjust and no provision is made to adjust the tubes for different eye widths. Still another and more common type of adjustment for binoculars is the center wheel focusing type which operates on the screw principle. The wheel is held in one position on the lower or object tubes and when rotated operates a spirally grooved ferrule. A spirally grooved rod, attached to the eyepiece tubes, operates within the ferrule thus increasing and decreasing the distance between the pupillary entrance and exit lenses for obtaining focus of the glass. This type of adjustment, while accurate, is too slow to be used on fast moving objects where the focus must be constantly changed and it is also very awkward to manipulate.

I have overcome these disadvantages by providing a rapid focus adjustment for binoculars and the like that has its adjusting member so positioned that it is moved in a direction parallel to the line of vision, is vernier in action, exerts considerable leverage on the movable tube, is quick and smooth in action and which may be simply and rigidly constructed.

Referring to the drawing, I have used the numeral 10 to designate the object tubes of the binocular. These tubes contain and support the object lenses of the binocular. The numeral 11 designates the eyepiece tubes of my binocular which contain and support pupillary lenses 12. These eyepiece tubes are slidably mounted within the object tubes 10. I have used the numeral 13 to indicate a spreader plate having each of its ends rigidly secured to each of the eyepiece tubes 11 and having the usual center hinge as shown in the drawing. The numeral 14 designates a spreader plate secured at each of its ends to the object tubes adjacent to the eyepiece tubes and having the usual type of center hinge.

The numeral 15 designates the supporting plate of a pin type hinge secured to one of the tubes 10 near its lower end portion and supporting a segmented cylindrical hinge tube 16. I have used the numeral 17 to designate a second supporting plate secured to the lower end portion of other tube 10 and supporting the small hinge tube 18. The small hinge tube 18 is so designed to fit between and coincide with the segments of the hinge tube 16 to form a continuous hollow tube.

I have used the numeral 19 to designate a control rod rigidly secured by riveting at one of its ends to the center of the hinge eye 13' of the plate 13. This rod 19 extends parallel to and between the tubes 10, is slidably embraced by the hinge of the plate 14, and extends into the inside passageways of the tubes 16 and 18 respectively for holding these tubes in alignment.

From the foregoing it will be seen that the tubes 16 and 18 form a guide for the rod 19 in its sliding movement and that the rod 19 serves as a hinge pin for the tubes 16 and 18 so that they may hinge. Thus the tubes 10 with their attendant eyepieces 11 may be hinged or flexed within limits, to make the binocular adaptable to various widths between the eyes of different individuals.

Figure 1:
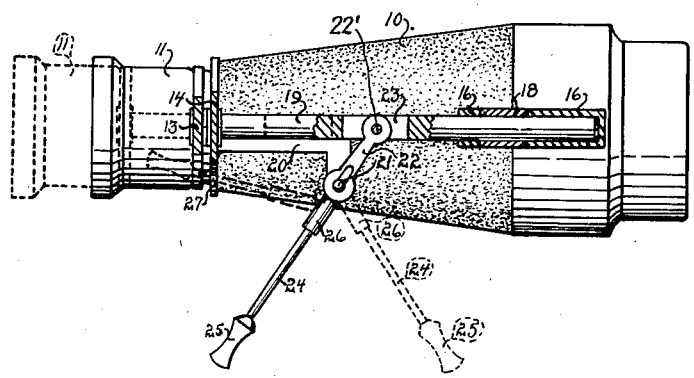
Fig. 1 is a cross sectional view of my improved binocular taken on the line 1—1 of Fig. 2.
Figure 4:
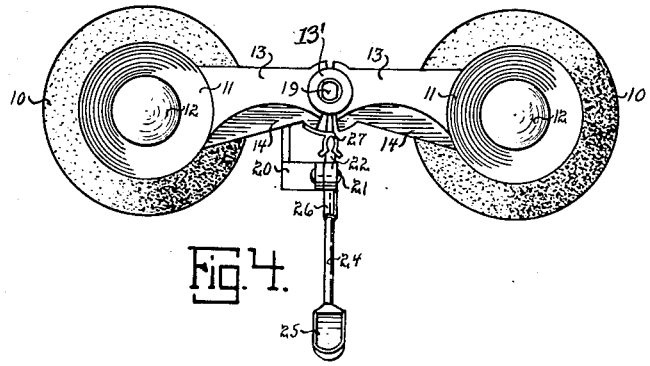
Fig. 4 is an end view of the complete binocular and more fully illustrates its construction.

The numeral 20 designates a bracket rigidly secured to one side of the center of the plate 14 extending parallel to the tubes 10 and thence outwardly to form a lever fulcrum support as shown in the drawing. The numeral 21 designates the fulcrum pin of the device which is rigidly secured to the fulcrum support of the bracket 20. The numeral 22 designates a lever link having one end pivotally mounted on a pivot pin 22′ secured in a slot 23 cut in the rod 19 near its center and its other end slidably and pivotally mounted on the fulcrum pin 21 as shown in Fig. 1 of the drawing. The numeral 24 designates an elongated lever bar hingedly secured to a small stud formed on the link 22 adjacent the fulcrum 21 and extending downwardly and terminating in the finger hold 25, as shown in the drawing.

The numeral 26 designates a spring ferrule mounted on the lever bar 24 and capable of rigidly securing the bar 24 to the stud on the link 22 when they are in alignment and against relative movement thereto.

I have used the numeral 27 to designate a spring clip secured to the plate 14 near its center, and designed to receive and retain the bar 24 when it is in a folded position.

The practical operation of my improved type of binocular adjustment is as follows: The eyepieces 11 are placed to the eyes of the user with the lever 24 and finger hold 25 downwardly, and the tubes are flexed until they are the proper distance to accommodate the width between eyes. The user then holds the binocular in the proper alignment on the object with one hand, and grasps the finger hold 25 with the other hand. The lever is then moved forward and back as shown by dotted lines in Fig. 1, thereby actuating the rod 19 and moving the eyepieces 11 and tubes 10 relative to each other until focus on the object is obtained. The focus can be kept on the object, if it be a rapidly moving object, by merely pushing or pulling the finger hold in a smooth sweeping motion to coordinate the focus with the speed of the object.

My type of binocular is of particular advantage when used at automobile, horse and aeroplane races, where the object viewed is moving away from and toward the spectator at great speed, and is highly desirable for all types of sports where it is necessary to change the focus of the binocular quickly and smoothly between objects at varying distances.

When it is desired to place the binocular in a case or like, the ferrule 26 is pulled downwardly against the tension of its spring and the lever bar 24 is hinged or pivoted until the shaft of the lever 24 is clipped into the spring clip 27, as shown by dotted lines in Fig. 1 of the drawing. This makes the binoculars compact and free of protruding parts when being carried in the pocket or in a case. When it is desired by the user to again use the binocular, the lever bar 24 is snapped out of engagement with the spring clip 27 and brought into alignment with the stud on the link 21. The spring will then force the ferrule over the stud thereby allowing the lever 24 to actuate the rod 19 for focusing the binocular.

Thus it will be seen that I have provided a rapid focusing binocular that may be quickly, smoothly and accurately adjusted for and kept in focus on rapidly moving objects, and that may be used efficiently where rapid change of focus is needed on different objects at various distances. Furthermore, with my device the control of focus is natural and simple and may be folded out of the way when the binocular is not in use.

Some changes may be made in the construction and arrangement of my improved rapid focusing binocular without departing from the real spirit and purpose of my invention, and it is my intention to cover by my claims any modified forms of structure or use of mechanical equivalents which may be reasonably included within their scope.

I claim:

1. In a device of the class described, a tube designed to support and contain optical lenses, a second tube designed to support and contain optical lenses, a means for hingedly securing said first mentioned tube parallel to said second mentioned tube, an eye piece tube, a second eye piece tube, a bar having each of its ends secured to said first and said second eyepiece tubes respectively and hinged at its center, a control element secured to the hinge element of said eyepiece tubes and extending through the hinged portion of said first and second mentioned tubes, a slot in said control element, an elongated lever having one of its ends in engagement with said slot in said control element and pivotally mounted therein, an arm operatively secured to one of said tubes parallel to said control element, a means for slidably and pivotally securing said lever to said arm at a point a short distance from that end of said lever which is operatively pivotally mounted in said slot in said control element, said lever actuating said control element for moving said eyepiece tubes relative to said tubes when said handle member of said lever is manually actuated.

2. In a binocular having upper telescoping lens tubes connected parallel to each other by a hinged bar and lower telescoping lens tubes connected parallel to each other by a hinged plate, a rapid focusing adjustment comprising, a rod slidably secured parallel to said lower tubes and having its upper end secured to said bar, a lever fulcrum secured to said plate between said lower tubes, a lever pivotally and slidably secured to said fulcrum to one side of the center of said lever, a means for pivotally securing said lever adjacent said fulcrum point to said rod, and a handle member secured to the other end of said lever; said handle member being farther from said fulcrum point than said fulcrum point is from said pivoted attachment to said rod; said lever actuating said rod for telescoping said upper and said lower tubes relative to each other when said handle member is actuated in approximate direction of the telescoping action of said tubes.

GUY E. CHESNUT, Jr.